Jan. 14, 1941.   C. T. FISH   2,228,512
ADJUSTABLE ATTACHMENT FOR LAWN MOWERS
Filed Dec. 6, 1939
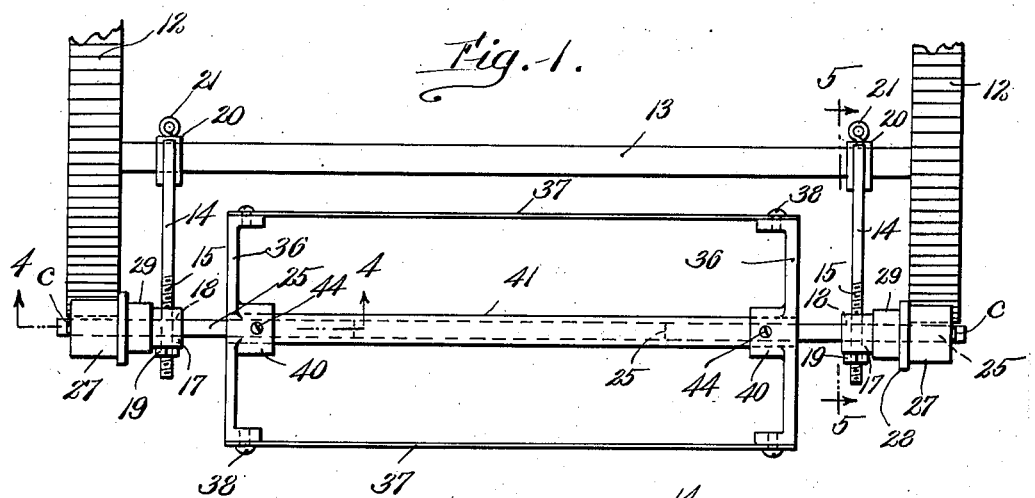
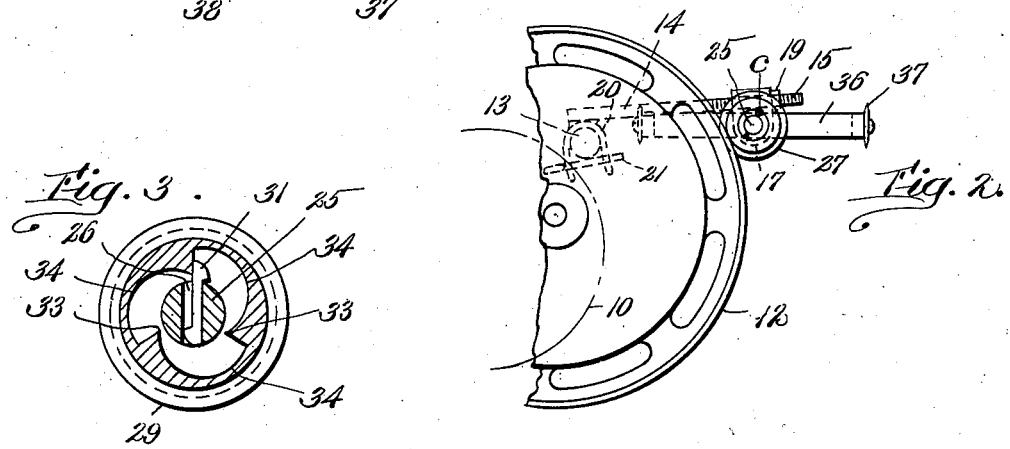
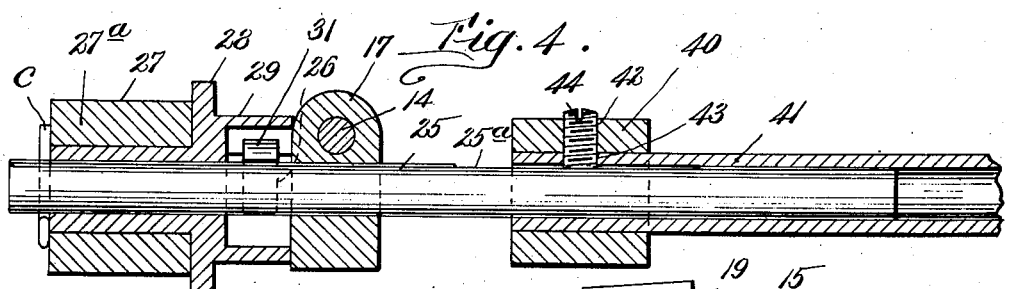
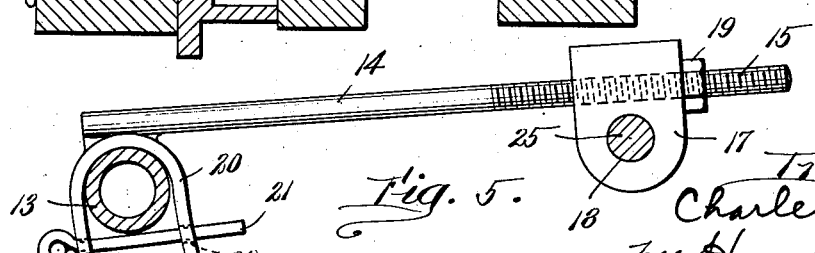
Inventor.
Charles T. Fish
by Harold E. Cole
Att'y.

Patented Jan. 14, 1941

2,228,512

UNITED STATES PATENT OFFICE 2,228,512

ADJUSTABLE ATTACHMENT FOR LAWN MOWERS

Charles T. Fish, Scituate, Mass.

Application December 6, 1939, Serial No. 307,850

4 Claims. (Cl. 56—238)

This invention relates to an adjustable attachment for lawn mowers.

In offering for sale attachments for lawn mowers to cut high weeds, such as blackheads and dandelions, which the cutter reel of the ordinary lawn mower does not sever, there is considerable sales resistance to them because attachments such as are illustrated in my Patent No. 2,104,343 cannot be adjusted in width, and thus an attachment will fit only one size lawn mower. Lawn mowers vary considerably in width or cutting area, and the distances apart of the wheels of lawn mowers of different makes that have the same size cutting reel vary somewhat, consequently a storekeeper would have to stock many different sizes of attachments to be able to fit them to the many sizes and types of lawn mowers commonly used. Inasmuch as my attachment is driven by means of its friction wheels which bear against and are rotatably driven by the lawn mower wheels, it has been my principal object to provide mechanism for my attachment that is easily adjustable so that its two friction driving wheels may be moved farther apart or closer together as desired.

Another object of my invention is to improve upon the mechanism that fastens my attachment to the lawn mower, and also to make that adjustable.

The foregoing and other objects which will appear as the nature of the invention is better understood, may be accomplished by a construction, combination and operative arrangement of parts such as is disclosed by the drawing and specification. The nature of the invention is such as to render it susceptible to various changes and modifications, and, therefore, I am not to be limited to said disclosures; but am entitled to all such changes therefrom as fall within the scope of my claims.

In the drawing:

Figure 1 is a plan view of my weed cutting attachment shown attached to a conventional form of lawn mower.

Figure 2 is a partial end elevational view of my said attachment fastened to a said lawn mower.

Figure 3 is a sectional view illustrating the clutch means for the shafts and friction wheels of my attachment.

Figure 4 is an enlarged sectional view taken on the line 4—4 of Figure 1 to illustrate the adjustable means whereby my attachment can be adjusted to several different sizes of lawn mowers.

Figure 5 is an enlarged sectional view taken on the line 5—5 of Figure 1 to show the connecting arm in detail that fastens my attachment to the lawn mower.

My attachment, as illustrated, can be readily attached or removed from the ordinary lawn mower M that commonly has a cutter reel 10, a pair of drive wheels 12 and a front bar or tie rod 13. Said attachment has a pair of connecting or supporting arms 14 each of which has a threaded portion 15 at one end which screw threadedly extends through a bracket member 17 which has a hole 18 in the lower portion thereof. At the other end of said connecting arm 14 is a yoke member 20 the ends of which are spaced apart, said yoke being fastened or welded to said arm 14 so as to hang off center, being tilted upwardly towards said screw threaded portion 15 as best illustrated in Figure 5 of the drawing. Inasmuch as said connecting arms 14 are higher than said front bar or rod 13 the fastening of said yoke so that it will tilt as aforesaid assures a more even fit over said rod 13. Said arms 14 are held in position by means of a pin member 21 such as a cotter pin that extends through holes 22 in the ends of said yoke member 20.

My attachment has two shafts 25 at opposite ends that extend from the side extremities of the attachment rotatably through said bracket holes 18 towards each other; but terminating a considerable distance from each other. Each has a slot 26 extending vertically therethrough. Mounted near the side extremities of each said shaft 25 is a driven friction wheel 27 which normally bears against the periphery of said lawn mower drive wheels 12 at a portion above the center thereof as shown in Figure 2 of the drawings, being driven in a direction opposite to that of said drive wheels 12. Said friction wheels 27 are held on said shafts 15 by cotter pins C, and are preferably covered with rubber 27a in order to make the operation of my attachment as quiet as possible. Each said friction wheel 27 has a flange member 28, and extending inwardly therefrom is a clutch housing portion 29 in which a dog 31 extends into said shaft slot 26 and projects beyond. Formed in the interior of said housing are toothed surfaces 33 and cam surfaces 34. When said lawn mower wheels 12 rotate in a rearward direction, as when the lawn mower is pulled backwardly, said shafts 25 are not rotated as said dog 31 slides along said cam surfaces 34 without hindrance; but when the lawn mower wheels rotate in a forward or normal direction, as when the lawn mower is being pushed forward in a normal mowing operation, said dog 31 is caused to bear against a tooth surface 33 with the result that rotation of said friction wheels 27 rotates said shafts 25 with it.

My cutting device that cuts the tall weeds, blackheads, etc. consists of a pair of spiders or brackets 36 which carry the actual cutting blades 37, being fastened thereto at their peripheral extremities by screws 38. Each said spider 36 has a hub portion 40, and extending into and between said hub portions 40 is a hollow tube 41 the interior diameter of which is large enough to slidably receive said shafts 25, for it is the extent that said shafts 25 extend into said tube 41 that determines the position of said friction wheels 27, which must be brought into position opposite and in contact with the said lawn mower drive wheels 12. In each said spider hub portion 40 is a hole 42, while in opposite end portions of said tube 41 are holes 43, through which holes 42 and 43 a set screw 44 passes and bears against a flattened portion 25a of a said shaft 25, thereby firmly holding said shafts 25 to said hub portions 40, so that rotation of said shafts by said friction wheels 27 rotates said spiders 36 and said tube 41 as well as said cutting blades 37. By merely unloosening said set screws 44 said shafts 25 may be moved farther into said tube or in the opposite direction to thereby bring said friction wheels 27 in exactly the desired position opposite the said drive wheels 12.

With my adjustable mechanism I have found that my attachment that carries cutting blades 16-inches long may be used on various sizes of lawn mowers having cutting reels that are from 16 to 18 inches long. While the cutting blades 37 will sometimes be shorter in length than the lawn mower cutting reels, in operating a lawn mower, part of the cutter reel overlaps a portion of the lawn that has been previously cut, so that an inch or two difference between the length of said cutting blades and said cutting reel does not affect the cutting efficiency of my attachment at all.

For lawn movers that have cutting reels from 18 to 20 inches long I provide a different size of attachment that carries cutting blades 18-inches long. It will thus be seen that with only two different sizes of my attachment I can equip all sizes of lawn mowers that are commonly used; whereas were it not adjustable it would take many more attachments to be able to equip the same number of different size lawn mowers.

What I claim is:

1. An attachment for a lawn mower comprising friction wheel means, shaft means connected thereto and adapted to be normally rotated thereby, a cutting device embodying supporting means, cutting means supported by said supporting means, a tubular member supported by opposite end portions of said supporting means, said shaft means extending into said tubular member, holding means adapted to adjustably hold said shaft means to said member in predetermined position, and holding instrumentalities connected to said attachment and adapted to be fastened to a lawn mower.

2. An attachment for a lawn mower comprising friction wheel means, shaft means connected thereto and adapted to be normally rotated thereby, a cutting device embodying brackets at opposite ends, cutting means supported by said brackets, a tubular member extending between and supported by said brackets, said shaft means extending into said tubular member, adjustable holding means to hold said shaft means in said tubular member in predetermined position, and holding instrumentalities connected to said attachment and adapted to be fastened to a lawn mower.

3. An attachment for a lawn mower comprising two friction wheels, two shafts connected thereto and adapted to be normally rotated thereby, a cutting device embodying brackets at opposite ends each having a hub portion, cutting means supported by said brackets, a tubular member extending into said hub portions and supported by said brackets said tubular member and hub portions having openings therein, movable pin members extending into said openings in said hub portion and tubular member and movable into contact with said shafts to thereby hold them in said tubular member in predetermined positions, and holding instrumentalities connected to said attachment and adapted to be fastened to a lawn mower.

4. An attachment for a lawn mower comprising a cutting device, friction wheel means, shaft means extending therefrom and connected to said cutting device, two connecting arms having screw-threaded end portions, bracket members each having a screw-threaded hole therein into which said screw-threaded end portions connectively enter and each having another hole through which said shaft means passes, each said connecting arm embodying connecting means at its other said end adapted to make connection with a said lawn mower.

CHARLES T. FISH.